United States Patent

Lesesky

[11] Patent Number: 5,917,632
[45] Date of Patent: *Jun. 29, 1999

[54] DATA COMMUNICATIONS COUPLER AND LENS FOR TRACTOR/TRAILER

[75] Inventor: Alan C. Lesesky, Charlotte, N.C.

[73] Assignee: Vehicle Enhancement Systems, Inc., Rock Hill, S.C.

[*] Notice: This patent is subject to a terminal disclaimer.

[21] Appl. No.: 08/604,197

[22] Filed: Feb. 21, 1996

Related U.S. Application Data

[63] Continuation-in-part of application No. 08/393,566, Feb. 23, 1995, Pat. No. 5,677,667.

[51] Int. Cl.$^6$ .................................................. H04B 10/00
[52] U.S. Cl. ............................................ 359/152; 340/431
[58] Field of Search ...................... 359/152, 159, 359/153, 143, 172, 173, 182; 340/431, 991

[56] References Cited

U.S. PATENT DOCUMENTS

| | | |
|---|---|---|
| 2,379,664 | 7/1945 | Stanko . |
| 2,483,815 | 10/1949 | Easton . |
| 3,154,360 | 10/1964 | Plishner . |
| 3,184,703 | 5/1965 | Piscitello et al. . |
| 3,387,606 | 6/1968 | Crafts et al. . |
| 4,041,470 | 8/1977 | Slane et al. . |
| 4,236,255 | 11/1980 | Burgener et al. ................. 359/143.3 |
| 4,624,472 | 11/1986 | Stuart et al. . |
| 4,682,144 | 7/1987 | Ochiai et al. ..................... 246/166.1 |
| 4,715,012 | 12/1987 | Mueller, Jr. . |
| 4,733,919 | 3/1988 | Jacobs et al. . |
| 4,735,461 | 4/1988 | Moller et al. . |
| 4,752,899 | 6/1988 | Newman et al. . |
| 4,767,181 | 8/1988 | McEowen . |
| 4,772,209 | 9/1988 | Muncey . |
| 4,838,797 | 6/1989 | Dodier . |
| 4,839,531 | 6/1989 | Stemmons et al. . |
| 4,897,642 | 1/1990 | DiLullo et al. . |
| 4,969,839 | 11/1990 | Nilsson . |
| 5,025,253 | 6/1991 | DiLullo et al. . |
| 5,142,278 | 8/1992 | Moallemi et al. . |
| 5,442,810 | 8/1995 | Jenquin ...................................... 455/66 |
| 5,450,226 | 9/1995 | Khan et al. ............................. 359/159 |
| 5,488,352 | 1/1996 | Jasper ..................................... 340/431 |
| 5,677,667 | 10/1997 | Lesesky et al. ........................ 340/431 |

*Primary Examiner*—Rafael Bacares
*Attorney, Agent, or Firm*—Bell Seltzer; Alston & Bird LLP

[57] ABSTRACT

A data communications coupler is provided for communicating data related to various operating conditions of a tractor and/or a trailer. The data communications coupler preferably includes a first coupler portion arranged to connect to a tractor. The first coupler portion has a first lens positioned therein for allowing data communications signals to pass therethrough. A second coupler portion is arranged to connect to a trailer and to connect to the first coupler portion. The second coupler portion has a second lens positioned therein for allowing data communication signals to pass therethrough. A data communicator is positioned in the first and second coupler portions for communicating data between the first and second coupler portions through the first and second lenses. Each of the first and second lenses preferably has a body integrally formed of a translucent material for allowing light to pass therethrough. The body includes an enclosed distal end portion for abuttingly contacting and interfacing with a distal opening of a coupler and a base integrally connected to the distal end portion and arranged for positioning means for data communications therein.

16 Claims, 3 Drawing Sheets

DATA COMMUNICATIONS COUPLER AND LENS FOR TRACTOR/TRAILER

RELATED APPLICATIONS

This application is a continuation-in-part of copending U.S. application Ser. No. 08/393,566 filed on Feb. 23, 1995 now U.S. Pat. No. 5,677,667 and which is hereby incorporated herein by reference.

FIELD OF THE INVENTION

This invention relates generally to a coupler and, more specifically, to a data communications coupler and lens for data communication between a tractor and a trailer.

BACKGROUND OF THE INVENTION

The trucking industry has for many years, used tractor/trailer combinations to transport cargo over the roadways to intended destinations. Conventionally, the tractors and the trailers are mechanically coupled together so that the tractor can pull the trailer with its cargo in an efficient and cost effective manner.

Various links between the tractor and the trailer provide vehicle subsystems with power or other signals to operate, i.e., lights, brakes. Thus, hydraulic, pneumatic, electrical, and other subsystems on the tractor/trailer combination have associated electrical conductors and pneumatic lines running therebetween so these subsystems can operate.

An example of such a subsystem includes the pneumatic braking system and associated pneumatic connections extending between the tractor and the trailer. These pneumatic connections typically include: hoses and pneumatic couplers, i.e., "gladhand" couplers, positioned between the tractor and the trailer. Conventionally, one pneumatic brake line connection is the emergency line providing constant pneumatic pressure to the trailer. The other pneumatic brake line connection provides a control signal to the trailer for service of the brakes, e.g., during vehicle operation. The gladhand pneumatic couplers are well known in the industry and have been specified by the "SAE" according to the standard number J318 (hereinafter referred to as "SAE J318").

The electrical subsystems of both the tractor and trailer operate in a manner which requires coordination between the electrical components on each to operate the tractor/trailer combination safely and effectively. Conventionally, in order to coordinate such operation and to supply power from the tractor to the trailer, a seven-pin connector has been used by the trucking industry to accomplish these and other electrical objectives. The connector includes two disengageable connector portions to permit the tractor and trailer combination to be disconnected. An example of such a seven-pin connector is illustrated in U.S. Pat. No. 4,969,839 by Nilsson titled "Electrical Connector." These seven-pin connectors also are well known and have been specified by the Society of Automotive Engineering "SAE" according to the standard number J560 (hereinafter referred to as "SAE J560"). Thus, one need only ask for an SAE J560 connector from an appropriate manufacturer, and the standard seven-pin connector will be delivered.

Each of the pins in the standard seven-pin connector is an electrical conductor carried by the plug portion of the connector which is adapted to mate with a corresponding electrical contact in the receptacle portion of the connector to thereby bus an electrical signal between the tractor and the trailer. The signals generally relate to specific dedicated electrical subsystems, for example, ground, turn signals, brake lights, clearance lamps, flashers, and other devices which require electrical power to function.

The trucking industry has not, until very recently, incorporated sophisticated electrical and electronic subsystems in tractor/trailer combinations which perform varied tasks that usually involve data manipulation and transmission. Computers, controllers, and computer-type electrical systems have simply not found their way into the tractor/trailer combination in any significant fashion up to now due, in part, to the low level of technological innovation in the trucking industry, due to a lack of governmental or other authoritative impetus which would otherwise require systems to be installed on tractor/trailer combinations that include sophisticated electronics and data communications, and due to the high number of existing conventional tractors and trailers currently in use by a variety of industries for transportation of cars and the like.

With the advent of anti-lock braking subsystems ("ABS") for example, and other new subsystems which promote tractor/trailer safety and enhanced performance, however, microprocessors have found their way into use in the trucking industry, and specifically in applications involving tractor/trailer combinations to enhance the performance of these new subsystems. It is apparent that the use of computers and microprocessors in general in the trucking industry will continue to expand and provide ever increasing capabilities to tractor/trailer combinations in a wide range of applications.

Along with the sophistication of computer and electronic subsystems comes the requirement of equally sophisticated and versatile data communications systems such as between microprocessors and devices which use data output from the computers or which input data to the computers. Thus, it is desirable to develop and implement data communication links and circuits to provide the microprocessors and systems in tractor/trailer combinations with reliable data communication. This is particularly true when data must reliably be communicated between data producing devices and data receiving devices that may be found both on the tractor and the trailer, and when data must be transmitted between the tractor and the trailer. An example of this type of data communication between the tractor and the trailer is found in an ABS subsystem where data about the performance of the brakes on the trailer is desirably communicated to a computer in the tractor which will, in turn, further actuate control valves on the trailer to control the ABS's performance.

The standard seven-pin connector, ubiquitous in the trucking industry, however, is simply not suited to provide sophisticated data communications and power between the tractor and the trailer. The seven-pin connector, and other similar connectors such as seen in U.S. Pat. No. 4,624,472 to Stuart et al. titled "Coupling Mechanism For Coupling Fluid And Electrical Lines Between Adjacent Vehicles," has only been used in the past to provide analog electrical signals, particularly power, to low-level, unsophisticated electrical subsystems in the tractor/trailer combination. The seven-pin connector and other similar connectors may also be readily disengaged either intentionally or accidentally which may cause various data communication and power problems in the system during operation of the tractor and trailer. Yet, the SAE J560 seven-pin connector continues to be an industry standard and is used in virtually every tractor/trailer in service today. Otherwise, the seven-pin connector will likely remain in service for many years and to some extent limit the upgrading of existing and future tractor and trailer combinations to move effective and sophisticated data communications systems.

OBJECTS AND SUMMARY OF THE INVENTION

In view of the foregoing background, it is therefore an object of the present invention to provide, in combination with a tractor and a trailer, an apparatus for monitoring various operating conditions of at least the trailer by a driver positioned on the tractor.

It is another object of the invention to provide a data communications apparatus and associated methods for a tractor/trailer combination that is rugged and reliable and is also compatible with a standard SAE J318 pneumatic coupler widely used in the trucking industry.

It is also an object of the invention to provide a data communications coupler and lens for a tractor and/or a trailer.

It is a further object of the invention to provide a lens for protecting data communication circuitry and for allowing data communication to pass therethrough when associated with a coupler.

These and other objects, features, and advantages of the present invention are provided in a data communications coupler for communicating data related to various operating conditions of a tractor and/or a trailer. The data communications coupler preferably includes a first coupler portion arranged to connect to a tractor. The first coupler portion has a first lens positioned therein for allowing data communications signals to pass therethrough. A second coupler portion is arranged to connect to a trailer and to connect to the first coupler portion. The second coupler portion has a second lens positioned therein for allowing data communication signals to pass therethrough. A data communicator is positioned in the first and second coupler portions for communicating data between the first and second coupler portions through the first and second lenses.

Also, according to the present invention, each of the first and second lenses preferably has a body integrally formed of a translucent material for allowing light to pass therethrough. The body includes an enclosed distal end portion for abuttingly contacting and interfacing with a distal opening of a coupler and a base integrally connected to the distal end portion and arranged for positioning means for data communications therein.

The tractor and trailer combination preferably has a pneumatic braking system to permit a driver to supply braking pressure from the tractor to the trailer. The pneumatic braking system preferably includes a plurality of pneumatic connections extending between the tractor and the trailer. The pneumatic braking system carried by the tractor and the trailer conventionally provides two physical connection(s) between the tractor/trailer: (1) a service (control) pneumatic brake line; and (2) a supply (constant air) pneumatic brake line. These pneumatic brake lines of the system preferably each include at least one pair of air hoses respectively connected to the tractor and the trailer and a coupler connected to the pair of air hoses. The coupler has first and second coupler portions arranged to facilitate connecting and disconnecting the pair of air hoses.

According to the invention, the pneumatic coupler(s), i.e., SAE J318 gladhand, preferably carries transceivers, such as infrared, inductive couplers, radio frequency (read and write) circuitry, ultrasonic (read and write) circuitry, microwave circuitry, infrared, and/or a combination of inductive coupling and radio coupling or other communication techniques, in either the service or emergency pneumatic coupler(s), or both, for providing a data communications channel between the tractor and the trailer. Further, the pneumatic couplers may be enhanced for electronic ground, clean power, video, or audio signals. The backward and forward compatibility of the SAE J318 gladhand, however, would be preserved. Also, it should be noted that the vehicle tractor/trailer combination will not move or suddenly stop if the emergency (supply) pneumatic gladhand coupler becomes uncoupled. Thus, communications between the tractor/trailer stops only when the vehicle stops. Therefore, various systems associated with the tractor and/or the trailer such as brake-by-wire to the trailer would be greatly enhanced with safety using the emergency (supply) coupler as the embodiment for housing the transceiver circuitry or other communication circuitry required for transmitting and receiving data communications between the tractor and the trailer.

Moreover, because a communications system can be compatible with the existing SAE J318 air brake line gladhand couplers, retrofitting and equipping of existing tractors and trailers for more sophisticated and versatile data communications is also possible according to the present invention. One advantage of such a retrofit is that it may be carried out gradually throughout a fleet without incurring any incompatibility between fitted and unfitted tractors and trailers and, thereby, reduce costs for upgrading to sophisticated data communications systems of the present invention.

BRIEF DESCRIPTION OF THE DRAWINGS

Other objects and advantages will appear as the description proceeds when taken in connection with the accompanying drawings, in which.

DETAILED DESCRIPTION

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, these illustrated embodiments are provided so that this disclosure will be thorough and complete and will fully convey the scope of the invention to those skilled in the art. Like numbers refer to like elements throughout.

Figure 1:
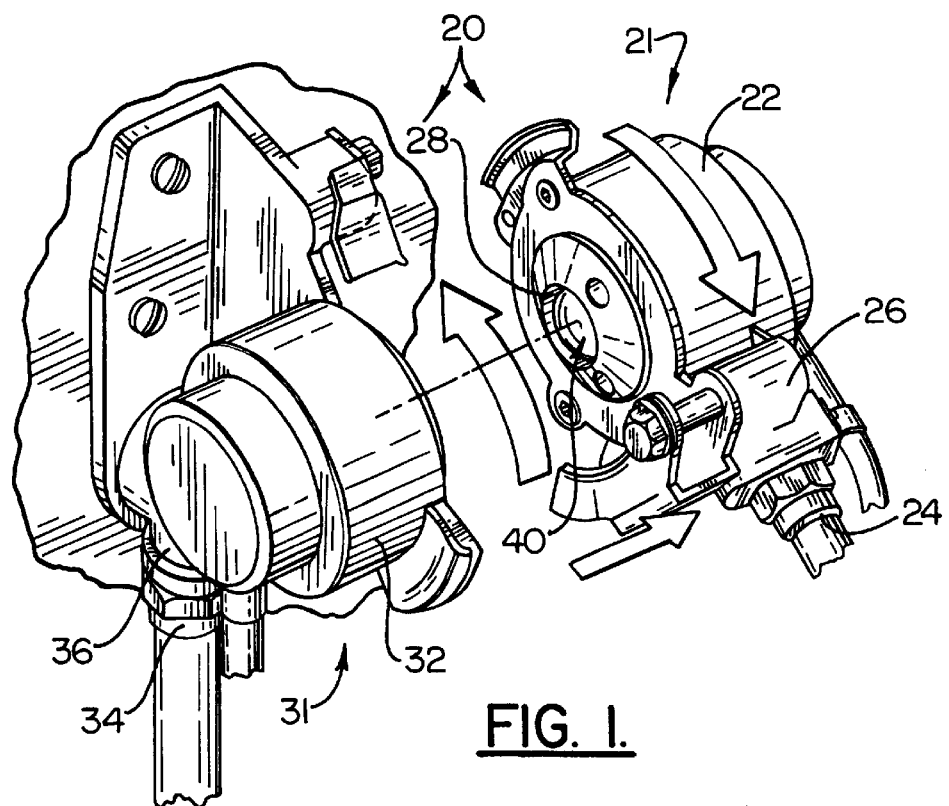
FIG. 1 illustrates an exploded perspective view of a data communications coupler in the form of pneumatic couplers and a lens according to the present invention.
Figure 2:
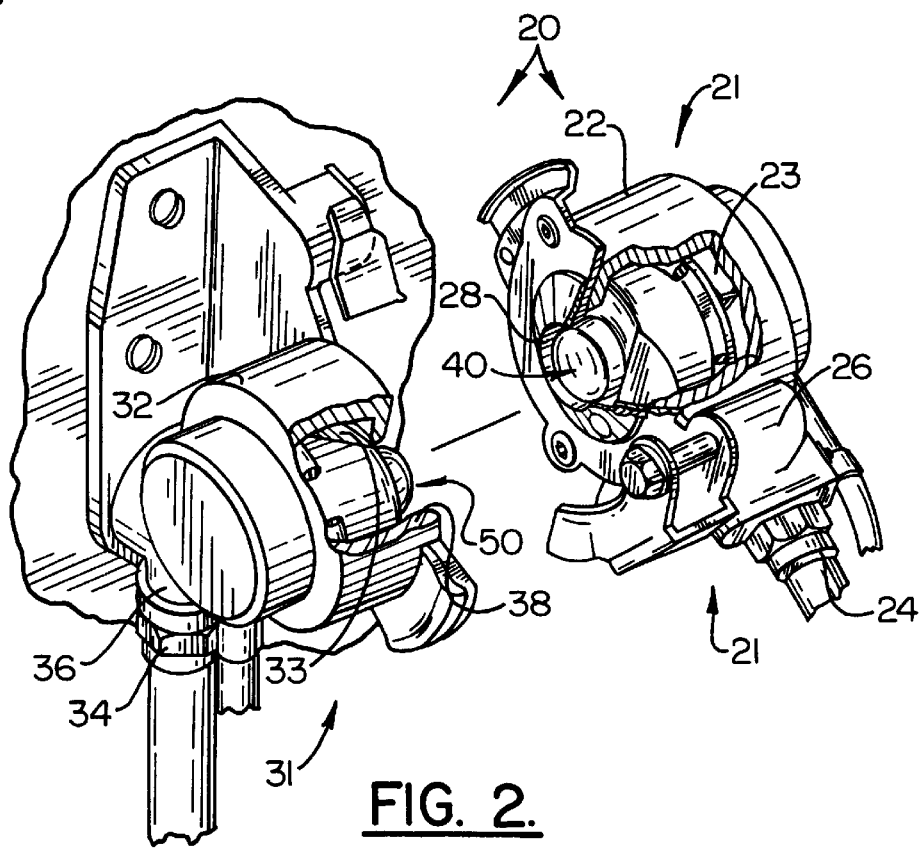
FIG. 2 illustrates a fragmentary perspective view of a data communications coupler and a lens for a tractor and/or trailer in the form of pneumatic couplers according to the present invention.

FIGS. 1–2 illustrate a data communications coupler 20 which includes at least one lens 40, 50, and preferably a pair of lenses 40, 50 as illustrated for monitoring various operating conditions of at least a trailer such as by a driver positioned on a tractor according to the present invention. In such a tractor and trailer combination, the trailer preferably is coupled to the tractor for pulling the trailer. As understood by those skilled in the art, the tractor and trailer combination further preferably has a pneumatic braking system carried by the tractor and the trailer to permit a driver to supply pneumatic braking pressure from the tractor to the trailer. The pneumatic braking system preferably includes at least one pair of hoses, i.e., gas, air, hydraulic or other fluid hoses, respectively connected to the tractor and the trailer, and a coupler 20 connected to each pair of the hoses. Each coupler 20 has interconnecting first and second coupler portions 21, 31, such as illustrated, arranged to facilitate connecting and disconnecting the respective air hoses. This tractor and trailer combination, as well as the braking system and coupler, are further described in copending U.S. application Ser. No. 08/393,566 filed on Feb. 23, 1995 and which is hereby incorporated herein by reference.

These pneumatic couplers 20, i.e., "gladhand" couplers, are preferably arranged to be positioned between and connected to the tractor and the trailer. More particularly, the couplers 20 have the first coupler portion 21 arranged to be connected to an air hose which is connected to or mounted to the tractor and the second coupler portion 31 arranged to be connected to the trailer. The air hose provides a path of travel of the pneumatic pressure to brakes associated with the trailer. Each of the first and second coupler portions 21, 31 preferably includes a hollow body 22, 32 arranged to be positioned in fluid communication with a fluid, such as various gases, air, and/or a liquid. The pneumatic braking system as understood by those skilled in the art preferably further includes a pressure supply source preferably mounted to the tractor which through the air hoses to supply pressure to the brakes, i.e., air brakes, of the combination of the tractor and the trailer, and more particularly to the trailer.

As understood by those skilled in the art, one pneumatic braking line of the pneumatic braking system preferably is the emergency line, i.e., supply or constant air, providing constant pneumatic pressure to the trailer. The other pneumatic braking line preferably provides a control signal, i.e., service, to the trailer for service of the brakes. It will be understood by those skilled in the art that either or both braking lines may be used according to the present invention. Also, a gladhand pneumatic coupler is well known in the industry and has been specified by the SAE according to the standard number "J318." The SAE J318 standard for couplers is further hereby incorporated herein by reference.

As illustrated in FIGS. 1–4, the SAE J318 coupler 20 includes first and second disengageable coupler portions 21, 31, i.e., moieties or halves, which, when interconnected or joined together, preferably will be mounted on the tractor or the trailer. In this fashion, one SAE J318 coupler 20 may be positioned on the tractor or trailer, but alternately, there may be an SAE J318 coupler 20 on the tractor and the trailer with a coiled or straight jumper hose or tubing connecting more than one of the SAE J318 couplers 20 together when an application requires such an arrangement.

Each of the first and second coupler portions 21, 31 (see also FIGS. 3–4) preferably includes a hollow body 22, 32 having a cavity 23, 33 formed therein. The first coupler portion 21 is provided with a body 22 to which a pneumatic air hose and a fitting are attached to the coupler portion 21. A first air hose preferably connects to an inlet port 24 positioned in fluid communication with the cavity 23 of the first coupler portion 31. A second air hose preferably connects to an outlet port 34 of the second coupler portion 31 via an associated fitting. The outlet port 34 is also arranged in fluid communication with the cavity 33 of the second coupler portion 31. The inlet and outlet ports 24, 34 preferably are formed in respective lower body portions 26 or 36 of the first and second coupler portions 21, 31 as illustrated. The second coupler portion 31 of the SAE J318 data communications coupler 20 also has a body 32 arranged to be mounted to the trailer using openings positioned in portions of the body 32.

In operation of an SAE J318 coupler 30 such as illustrated, and as understood by those skilled in the art, the first and second coupler portions 21, 31 are interconnected or joined together with a frictional fit between respective elastomeric seals along front portions thereof and with respective interlocking upper and lower flanges which extend outwardly from the respective bodies. For clarity and brevity of explanation, those elements similar to the SAE J318 coupler 20, will be readily understood by those skilled in the art and need not be repeated throughout the description of these various embodiments. The emphasis in the remaining portions of the description of the coupler 20 will be related to the retrofitting or equipping the standard SAE J318 coupler 20 with means, or a data communicator, for communicating data between a tractor and a trailer and one or more lenses 40, 50 positioned in the coupler 20 for protecting the internal data communicator and for allowing data communication to pass therethrough.

Figure 3:
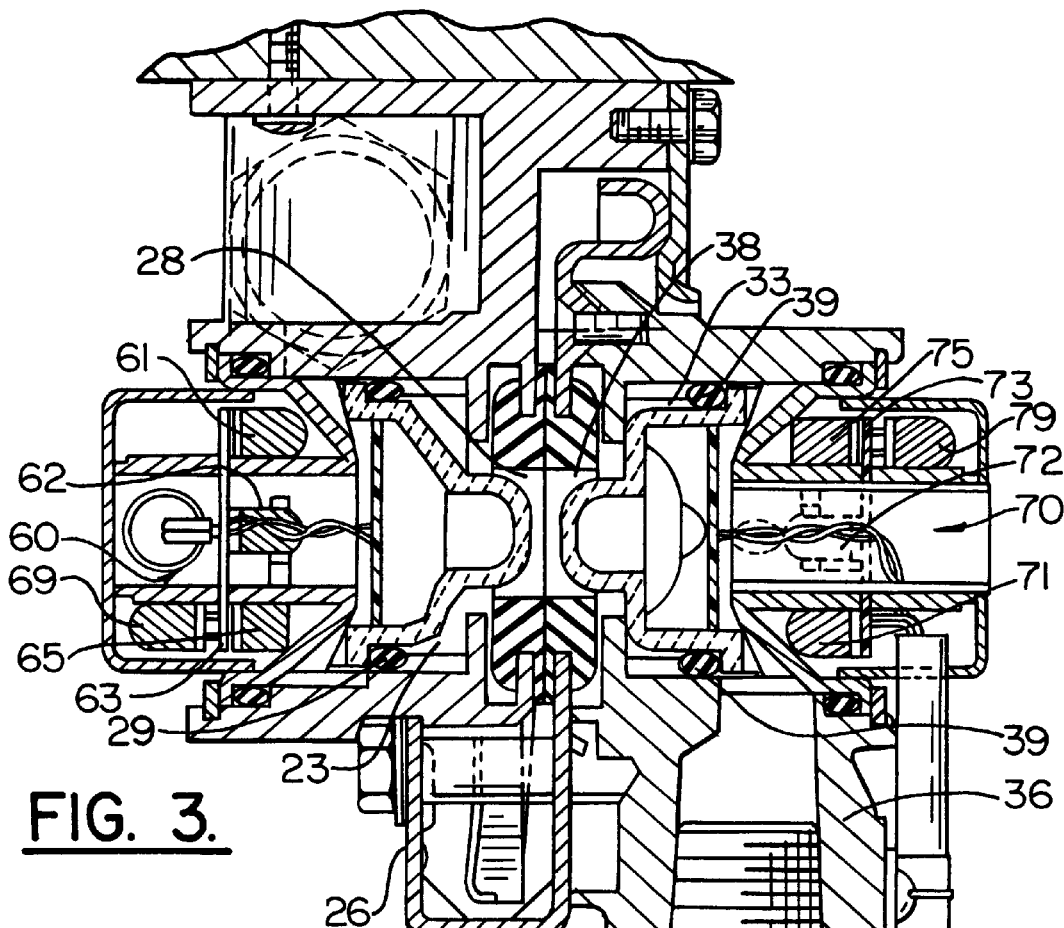
FIG. 3 illustrates a vertical sectional view of a data communications coupler and lens for a tractor and/or trailer according to the present invention.
Figure 4:
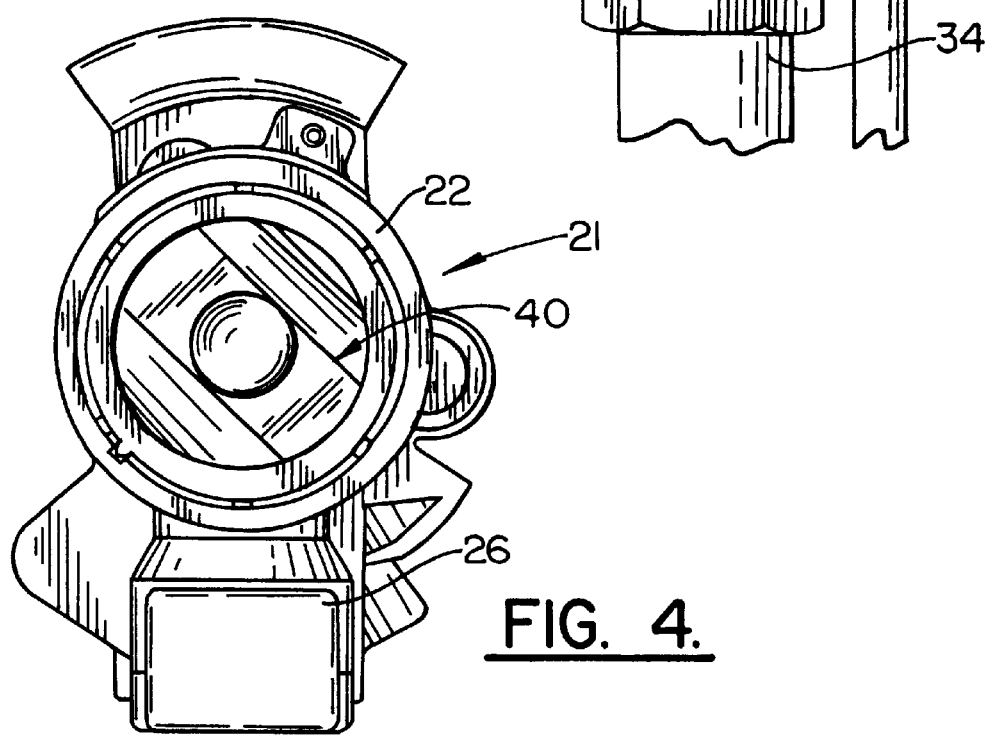
FIG. 4 illustrates a rear elevational view having a rear cover removed of a data communications coupler and lens for a tractor and/or trailer according to the present invention.

As best illustrated in FIG. 3, the coupler 20 of the present invention also has a data communicator 80, e.g., data communicating or communications means, which includes respective transceivers 60, 70, i.e., at least one transmitter and at least one receiver, carried by the first and second coupler portions 21, 31 of the coupler 20 and which are arranged for communicating signals representative of monitoring data from a trailer to a tractor so as to in turn be monitored by a driver positioned on the tractor, i.e., in the cab. The first and second transceivers 60, 70, and the term "transceiver" more particularly, will be understood to include various means for transmitting and/or receiving signals representative of monitoring data related to various operating conditions of a tractor and/or a trailer. The first and second transceivers 60, 70 are preferably respectively positioned in the hollow bodies 22, 32 of the first and second coupler portions 21, 31. The monitored data preferably is representative of the operating conditions of various components of the tractor and/or trailer and/or cargo integrity and conditions as further described herein. Although the first and second coupler portions 21, 31 each respectively include at least one transceiver 60, 70, and preferably more than one infrared transceiver device 60, 70 (see FIG. 3) is preferably included in each coupler portion 21, 31 to provide redundancy and to compensate for dirt or corrosive build up in and around the bodies 22, 32 of the coupler portions 21, 31. The first and second coupler portions 21, 31 may be either customized couplers preferably having the gladhand configuration or may be a standard gladhand coupler 20 retrofitted or equipped for carrying the transceivers 60, 70 of the data communications coupler 20 according to the present invention.

According to the invention, as illustrated in FIGS. 2–3, a first transceiver 60, i.e., preferably an infrared transceiver, is positioned within a cavity 23 of the body 22 of the first coupler portion 21 and preferably is arranged to transmit and receive data to and from first and second controllers of a data communications system. A corresponding second transceiver 70 is also positioned within a cavity 33 of the body 32 of the second coupler portion 31. The first and second transceivers 60, 70 preferably each have a plurality of transmitters, i.e., light emitting diodes ("LEDs") 61, 62, 71, 72 mounted to respective printed circuit boards ("PCBs") 63, 73. Receivers, i.e., photodetectors 65, 75, are also mounted to the PCBs 63, 73 as illustrated. The various drive, filtering, and amplification circuitry, as well as other desired circuitry such as oscillators, microprocessors, power supplies, preferably are mounted to the PCBs 63, 73, i.e., using surface mount technology, as understood by those skilled in the art. This circuitry preferably includes compensation means for compensating for dirt and for corrosive build-up on the coupler portions 21, 31 which may otherwise inhibit data communications. The compensation means is preferably accomplished by an infrared receiver amplifier and feedback circuit, although other various drive circuitry understood by those skilled in the art may also be used.

The first and second PCBs are preferably mounted within respective plugs positioned within the cavities 23, 33. The PCBs 63, 73 are also electrically connected to twisted pair cable extending through respective tractor and trailer conduits and which are connected to the lower body portions 26, 36 of the first and second coupler portions 21, 36 by cable fasteners. First and second elastomeric o-rings or seals 29, 39 preferably are positioned around the lenses 40, 50 positioned closely adjacent the first and second openings or ports 28, 38 so that light transmitted by the LEDs 61, 62, 71, 72 easily passes to the other corresponding coupler portion 21, 31 through the lenses 40, 50 and through the openings 28, 38. The PCBs 63, 73 each also preferably have at least one LED 69, 79 arranged to provide conspicuity to be used for diagnostic purposes such as when diagnosing a subsystem performing condition.

The plugs each have forward portions thereof with a generally frusto-conical shape integrally formed with plug base members. The plugs preferably are positioned in rearward portions of the cavities 23, 33. The cavities 23, 33 each respectively receive the lenses 40, 50 in combination with the plugs so that the lenses 40, 50 and transceivers 60, 70 positionally align and cooperate, e.g., interfacing relationship. An exhaust port 118 is also illustrated in this embodiment of the coupler 103 in the first coupler portion 110 which cooperates with the valves 125, 185 to provide a quick pressure release function as understood by those skilled in the art. It will also be understood according to this invention that other SAE J318 standard couplers without the quick release function as illustrated herein may also be used.

Figure 5:
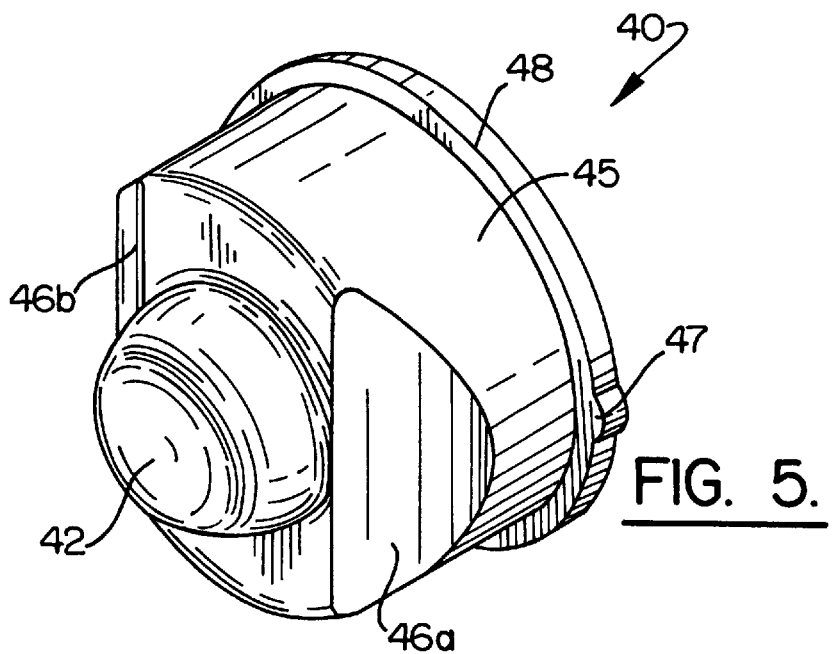
FIG. 5 illustrates a left side perspective view of a lens for a data communications coupler for a tractor and/or trailer according to the present invention.
Figure 6:
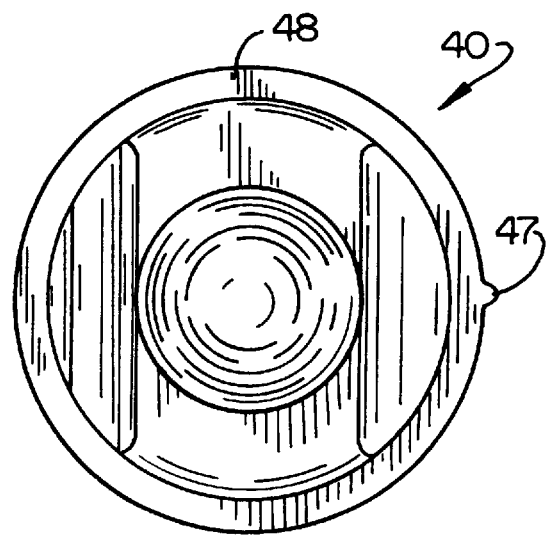
FIG. 6 illustrates a front elevational view of a lens for a data communications coupler for a tractor and/or trailer according to the present invention.
Figure 7:
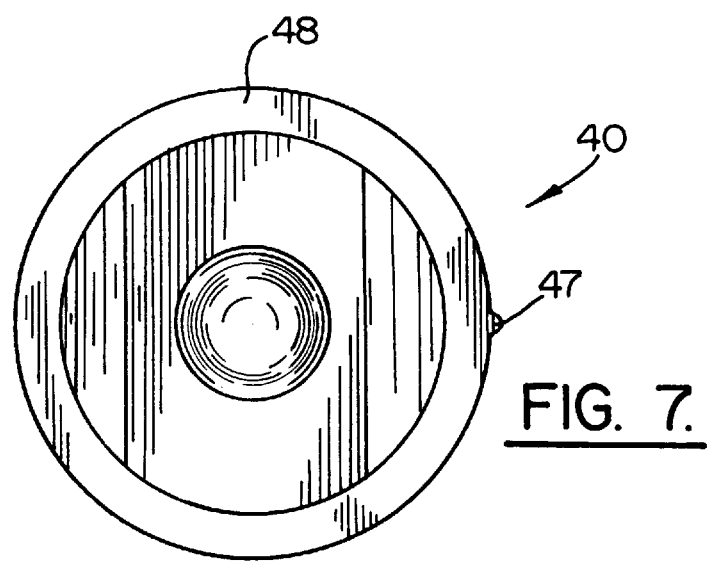
FIG. 7 illustrates a front elevational view of a lens for a data communications coupler for a tractor and/or trailer according to the present invention.

At least one coupler portion 21, 31, and preferably each of the first and second coupler portions 21, 31, each include a lens 40, 50. As best illustrated in FIGS. 5–7, each lens 40, 50 preferably has a body 41, 51 integrally formed of a translucent material for allowing light to pass therethrough. The body 42, 52 includes an enclosed distal end portion for abuttingly contacting and interfacing with a distal opening 28, 38 of a coupler 20 and a base 45, 55 integrally connected to the distal end portion 42, 52 and arranged for positioning means for data communications 60, 70 therein. The distal end portion 42, 52 of the body 41, 51 preferably has a bulbous shape, and the base 45, 55 preferably has a bulbous shape having a larger diameter than the diameter of the bulbous-shaped distal end portion 42, 52. The base also has upper portions 46a, 46b, 56a, 56b thereof sloping downwardly from and closely adjacent the distal end portion 42, 52 for providing a mating interface with inner body portions or the cavities 23, 33 of a coupler 20. Each lens 40, 50 also preferably has an annular lip or rim 48, 58 connected to and integrally formed with the base, 45, 55, e.g., surrounding the base 45, 55. The coupler 20 preferably also includes a guide channel, and the lens preferably includes a lens guide member 47, 57 integrally formed with the body, e.g., preferably integrally formed with the annular lip or rim 48, 58, for guiding the lens 40, 50 into inner body portions 23, 33 of a coupler 20 so that the lens 40, 50 in positionally aligned therein.

Accordingly, although embodiments of optical communication, i.e., infrared, electro-mechanical communication, i.e., inductive, and power connections are illustrated and described, it will be understood that other types of data communications transmitting and receiving technologies and power connections also may be carried by the coupler 20 according to the present invention, such as radio frequency, microwave frequency, acoustic, video communication such as through light transmitters and receivers, laser and visible optical communication, electromagnetic, capacitive, as well as various other power and data communications technologies. The data communications channel, or channels, of the present invention is preferably interfaced with at least one SAE J318 compatible pneumatic coupler 103, 104 which preferably serves in the present embodiment to electrically link portions of the data communications system 200 as well as preferably the previous electrical power link (see FIGS. 9 and 16) needs which have heretofore been necessary in a tractor/trailer vehicle combination 50, 300.

A coupler 20 and other communication channel components provided in accordance with the present invention allow the interconnection of intelligent computer systems on a vehicle such as tractor/trailer combinations. Because prior SAE J318 couplers are routinely subjected to the harshest environmental conditions, including temperature extremes, severe vibration, dirt and corrosive atmospheres, it is not uncommon to find that dirt buildup and/or loosening of the contacts from prolonged excessive vibration in the current have reduced the integrity of the connection to the point where subsystems on the tractor/trailer are non-functional. Another advantage of the data communications coupler 20 and the lens of the present invention will be recognized by those with skill in the art since no contacts are employed, and no oxidation and dirt buildup will then cause signal degradation.

A data communications coupler 20 provided in accordance with the present invention is also immune to the effects of extreme vibration, because an efficient transceiver 60, 70, or infrared transceiver, is maintained as long as the coupler portions 21, 31 are properly mated. Also, for example, the coupler portions 21, 31 even may be separated, i.e., in excess of one-half inch, before communications are interrupted.

In the drawings and specification, there have been disclosed typical preferred embodiments of the invention, and although specific terms are employed, these terms are used in a descriptive sense only and not for purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed:

1. A data communications coupler for providing data communications for various operating conditions of at least a trailer connected to a tractor, the data communications coupler comprising:

a first coupler portion arranged to connect to a tractor, said first coupler portion including a first lens positioned therein for allowing data communications signals to pass therethrough;

a second coupler portion arranged to connect to a trailer and to connect to said first coupler portion, said second coupler portion including a second lens positioned therein for allowing data communication signals to pass therethrough; and means respectively positioned in said first and second coupler portions for communicating data between said first and second coupler portions through said first and second lenses, wherein said first and second lenses each comprise a body formed of a translucent material for allowing light to pass therethrough, said body including a distal end portion for extending into a distal opening of a coupler and a base connected to said distal end portion.

2. A data communications coupler as defined in claim 1, wherein said data communications means comprises at least a first infrared transceiver positioned in said first coupler portion and at least a second infrared transceiver positioned in said second coupler portion for communicating data between said first and second coupler portions.

3. A data communications coupler as defined in claim 2, wherein said first and second coupler portions respectively comprise interconnecting first and second gladhand coupler portions, each of said first and second gladhand coupler portions having a hollow body arranged to be positioned in fluid communication with a fluid and wherein said first and second transceivers are respectively positioned within said hollow body of said first and second gladhand coupler portions.

4. A data communications coupler as defined in claim 1, wherein the distal end portion of the body of each lens abuttingly contacts and interfaces with a distal opening of a coupler and wherein the base is arranged for positioning means for data communications therein.

5. A data communications coupler for providing data communications for various operating conditions of at least a trailer connected to a tractor, the data communications coupler comprising:

a first gladhand coupler portion arranged to connect to a tractor, said first coupler portion including a first lens positioned therein for allowing data communications signals to pass therethrough;

a second glad hand coupler portion arranged to connect to a trailer and to connect to said first coupler portion, said second coupler portion including a second lens positioned therein for allowing data communication signals to pass therethrough; and first and second data communicators respectively positioned in said first and second gladhand coupler portions for communicating data between said first and second gladhand coupler portions through said first and second lenses.

6. A data communications coupler as defined in claim 5, wherein said first and second data communicators comprises at least a first transceiver positioned in said first gladhand coupler portion and at least a second transceiver positioned in said second gladhand coupler portion for communicating data between said first and second gladhand coupler portions.

7. A data communications coupler as defined in claim 6, wherein said first and second lenses each comprise a body integrally formed of a translucent material for allowing light to pass therethrough, said body including an enclosed distal end portion for abuttingly contacting and interfacing with a distal opening of a coupler and a base integrally connected to said distal end portion and arranged for positioning means for data communications therein.

8. A data communications coupler as defined in claim 7, wherein said distal end portion of said body of each of said first and second lenses has a bulbous shape.

9. A data communications coupler as defined in claim 8, wherein said base of each of said first and second lenses has a bulbous shape having a larger diameter than said bulbous distal end portion and has portions thereof sloping downwardly closely adjacent said distal end portion for providing a mating interface with inner body portions of a coupler.

10. A data communications coupler for providing data communications for various operating conditions between a trailer connected to a tractor, the data communications coupler comprising:

at least one coupler portion arranged to connect to a tractor or a trailer, said at least a coupler portion including a lens positioned therein for allowing data communications signals to pass therethrough; and means respectively positioned in said least one coupler portion for communicating data through said lens between a trailer connected to a tractor, wherein said lens comprises a body formed of a translucent material for allowing light to pass therethrough, said body including a distal end portion and a base connected to said distal end portion and arranged for positioning said means for data communications therein.

11. A lens for a coupler, the lens comprising a body integrally formed of a translucent material for allowing light to pass therethrough, said body including an enclosed distal end portion for abuttingly contacting and interfacing with a distal opening of a coupler and a base integrally connected to said distal end portion and arranged for positioning means for data communications therein.

12. A lens as defined in claim 11, wherein said distal end portion of said body has a bulbous shape.

13. A lens as defined in claim 12, wherein said base has a bulbous shape having a larger diameter than said bulbous distal end portion and has portions thereof sloping downwardly closely adjacent said distal end portion for providing a mating interface with inner body portions of a coupler.

14. A lens as defined in claim 11, further comprising a lens guide member integrally formed with said body for guiding said lens into inner body portions of a coupler so that the lens in positionally aligned therein.

15. A method of communicating data between a tractor and a trailer having first and second gladhand coupler portions respectively connected thereto, the method comprising:

positioning at least one lens in the first gladhand coupler portion;

transmitting data through the at least one lens positioned in the first gladhand coupler portion; and receiving data through the at least one lens positioned in the first gladhand coupler portion.

16. A method as defined in claim 15, wherein the positioning step includes the step of guiding a peripheral portion of the at least one lens into the body of the first coupler portion along a guide channel positioned in the body of the first coupler portion.

* * * * *